(12) United States Patent
Felix et al.

(10) Patent No.: US 12,420,275 B2
(45) Date of Patent: Sep. 23, 2025

(54) DEVICE FOR SEALED TRANSFER BETWEEN TWO ENCLOSED VOLUMES, FEATURING SECURE OPENING

(71) Applicant: ABC TRANSFER, Tours (FR)

(72) Inventors: Julien Felix, Vendome (FR); Jean-Luc Schneider, Saint Firmin des Pres (FR); Thierry Girard, Paris (FR)

(73) Assignee: ABC TRANSFER, Tours (FR)

( * ) Notice: Subject to any disclaimer, the term of this patent is extended or adjusted under 35 U.S.C. 154(b) by 135 days.

(21) Appl. No.: 17/774,639

(22) PCT Filed: Nov. 5, 2020

(86) PCT No.: PCT/FR2020/052009
§ 371 (c)(1),
(2) Date: May 5, 2022

(87) PCT Pub. No.: WO2021/089951
PCT Pub. Date: May 14, 2021

(65) Prior Publication Data
US 2022/0371001 A1   Nov. 24, 2022

(30) Foreign Application Priority Data

Nov. 5, 2019   (FR) .................................. FR1912410

(51) Int. Cl.
*B01L 1/02* (2006.01)
(52) U.S. Cl.
CPC ......... *B01L 1/02* (2013.01); *B01L 2200/0689* (2013.01); *B01L 2300/043* (2013.01); *B01L 2300/0803* (2013.01)

(58) Field of Classification Search
CPC ............... B01L 1/02; B01L 2200/0689; B01L 2300/043; B01L 2300/0803
USPC ...................................................... 141/21, 383
See application file for complete search history.

(56) References Cited

U.S. PATENT DOCUMENTS 5,421,626 A * 6/1995 Glachet .................... F16J 13/18
292/241
2016/0208527 A1 * 7/2016 Dufour ................... G21F 7/005

* cited by examiner

*Primary Examiner* — Craig M Schneider
*Assistant Examiner* — Christopher M Afful
(74) *Attorney, Agent, or Firm* — McDonnell Boehnen Hulbert & Berghoff LLP (57) ABSTRACT

The invention relates to a sealed transfer device between two enclosed volumes, comprising two flanges (10, 20) that can be secured to each other by a first bayonet connection, two doors (11, 21) which close off the passage openings defined by the flanges and can be secured to each other by a second bayonet connection, and a control mechanism comprising a control member (3) that is movably mounted on the first flange (10) between a closed position and an open position of the doors (11, 21), characterized in that the control mechanism comprises a member (7) for locking the second door (21) to the first door (11), ensuring that the doors are locked together when the control member (3) switches into the open position of the first and second doors, said locking member (7) being integrated into the first door (11).

10 Claims, 10 Drawing Sheets

DEVICE FOR SEALED TRANSFER BETWEEN TWO ENCLOSED VOLUMES, FEATURING SECURE OPENING

CROSS REFERENCE TO RELATED APPLICATION

This application is a U.S. National Phase of International Application No. PCT/FR2020/052009, filed Nov. 5, 2020, which claims priority to French Patent Application No. FR1912410, filed Nov. 5, 2019, both of which are incorporated by reference herein in their entirety.

TECHNICAL FIELD OF THE INVENTION

The invention relates to a sealed transfer device between two enclosed volumes.

In the present application, "volume" means any product, equipment or installation delimiting a volume. Thus, it can be an enclosure, an insulator, a receptacle, a container, a bag, etc.

"Enclosed volume" is understood to mean a volume isolated from the external environment. This may be in particular, but not exclusively, a volume for preparing, storing and/or handling products that must not be in contact with the outside or with a user.

The transfer device according to the invention is intended in particular, but not exclusively, to connect two enclosed volumes in order to transfer products from one volume to the other without breaking the containment. This may include, for example, the transfer of hazardous products such as certain biological, chemical or radioactive products, the transfer of components such as stoppers, vials, plungers, syringes, etc., the transfer of environmental control devices such as culture medium plates, particle counters, etc., the transfer of cleaning systems, the transfer of liquids, powders, tools, the transfer of waste to the outside of the enclosure and/or the transfer of any element necessary to production or maintenance of the production line.

PRIOR ART

The sealed transfer devices between two enclosed volumes conventionally themselves comprise two flanges each defining a passage opening into the enclosed volumes, each of the passage openings being closed off by a door. The flange and door of one of the enclosed volumes are capable of being connected respectively to the flange and to the door of the other enclosed volume by a bayonet connection and of being secured to each other under the action of a rotational movement of the one of the flanges and associated door with respect to the flange and door to which they are attached.

The sealed transfer devices further comprise a control member for opening and closing the two doors that are attached and secured to each other. The control member, movably mounted on one of the flanges, may be manipulated from inside one of the volumes. In order to avoid a sealing breach between the two secured volumes, the sealed transfer devices are advantageously provided with mechanisms to secure the opening of the doors.

Patent application EP0586307 describes a sealed transfer device thus secured. Thus, the sealed transfer device comprises a movable control member mounted on one of the flanges so as to be able to move between a closed position and an open position, a system of ramps interposed between the control member and the door associated with the flange on which the control member is mounted, so as to detach the door from the associated flange when the control member is moved from its unlocked position to its open position, and a series of mechanical locks. Two of the locks prevent any opening maneuver as long as the door of the other enclosed volume is not present and as long as the flange associated with this door is not fully connected to the flange bearing the control device, a third lock preventing any disconnection of the two flanges and a fourth lock preventing the control member from returning to its initial position when the doors are open. The drawback of the implemented safety mechanism is that it complicates the structure of the transfer device, making it difficult to manufacture but also increasing the risks of impacting its reliability from a sealing and cleanability point of view. Another drawback of such a mechanism is that it proves difficult to maneuver in certain circumstances.

The invention aims to remedy these problems by proposing a sealed transfer device between two enclosed volumes offering simplified and increased securing of the opening of the doors, coupled to one another, of the two volumes, that is reliable from a sealing point of view and easy to implement.

Another object of the invention is to provide a transfer device offering improved opening ergonomics.

Another object of the invention is to propose a transfer device offering shapes allowing improved and facilitated cleaning.

SUBJECT MATTER OF THE INVENTION

To this end, and according to a first aspect, the invention provides a sealed transfer device between two enclosed volumes, comprising a first and a second flange that define a passage opening into the enclosed volumes, said first and said second flange being able to be secured to one another by a first bayonet connection, a first and a second door closing off the passage openings, said first and said second door being able to be secured to one another by a second bayonet connection, the first door being hingedly mounted on the first flange by means of a hinge, said hinge comprising a hinge pin and a control mechanism comprising a control member movably mounted on the first flange between a closed position and an open position of the first and second doors secured to one another, the device being remarkable in that the control mechanism comprises a member for locking the second door on the first door, ensuring that the doors are locked together when the control member switches into the open position of the first and second doors, said locking member being integrated into the first door.

Advantageously, the member for locking the second door to the first door comprises a locking finger that extends toward the passage opening and is radially movable between a position in which it is recessed within the first door and a position for locking the doors together in which it projects radially from the first door.

According to an advantageous embodiment, the transfer device further comprises a member for locking the second flange to the first flange when the first and second doors are in the open position, said member being provided at the hinge.

Advantageously, the member for locking the second flange to the first flange comprises an oblong hole receiving a rotational pin parallel to the hinge pin and coupled to the latter by drive means on the one hand and a locking finger extending toward the passage opening, said locking member being translatable in a direction perpendicular to the hinge pin, between a position in which the finger is recessed within the first flange and a position for locking the flanges together in which the finger projects radially from the first flange.

Advantageously, the rotational pin is actuated by an external lever passing through the first flange so as to allow the opening of the first door. Crossing the flange allows the problem relating to sealing to be overcome.

According to an advantageous configuration, the control mechanism further comprises a first blocking member ensuring the blocking of the control member in the closed position in the absence of the second flange.

Advantageously, the first blocking member comprises an eccentric hole crossed by a rotational pin with which the control member is secured, said first blocking member being radially movable between a locking position in which the eccentric hole blocks the rotation of said control member and an unlocking position in which the eccentric hole is moved to allow rotation of the control member, the movement of said second blocking member being ensured by a lug of the bayonet system of the second flange.

It may also be provided that the control mechanism to comprise a second blocking member ensuring the blocking of the control member in the absence of the second door.

Advantageously, the second blocking member is radially movable between a blocking position in which it has a peripheral end engaged in a blocking bore in said control member and a release position in which said peripheral end is disengaged from the blocking bore, the second blocking member being moved by a lug of the bayonet system of the second door.

Advantageously, the control member is movable about an axis tangential to the periphery of said first flange, between a closed position where said member forms an angle α with the transverse plane of the flange, and an open position where said member forms an angle β greater than α with the transverse plane and causes the coupled doors to open.

Advantageously, the control member is a handle for opening the alpha door, which can be activated manually and is movably mounted in rotation about a pin parallel to the hinge pin and located diametrically opposite the hinge.

BRIEF DESCRIPTION OF THE DRAWINGS

Other features and advantages of the invention will become apparent from the following detailed description of the invention with reference to the appended figures, in which.

For greater clarity, identical or similar elements of the various embodiments are denoted by identical reference signs in all of the figures.

In the following, the terms "inside" or "internal" in relation to an enclosed volume mean that which is in or directed toward the inside space of the enclosed volume. Similarly, the terms "outside" or "external" in relation to an enclosed volume mean that which is outside the inside space of the enclosed volume or directed away from the inside of the enclosed volume.

DETAILED DESCRIPTION OF THE INVENTION

In relation to the figures, a sealed transfer device between two enclosed volumes is described.

Figure 1:
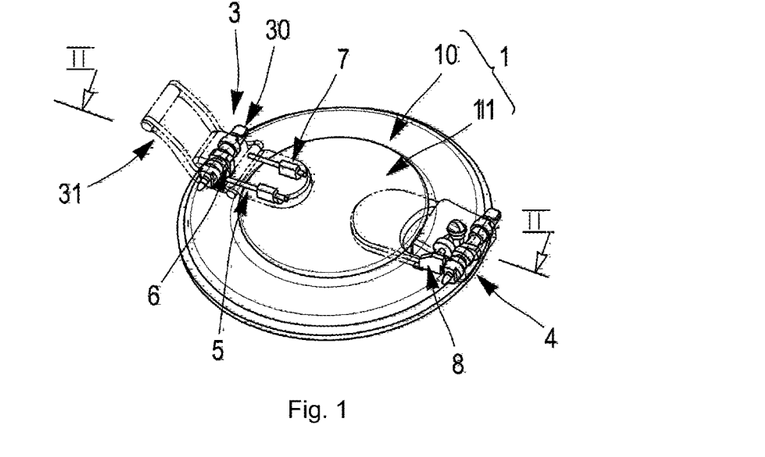
FIG. 1 is a perspective view of the closure assembly of a first volume, on the interior side of the volume.

The transfer device according to the invention comprises a first assembly 1, shown in FIG. 1, including a first flange 10 which defines a passage opening into a first enclosed volume (not shown), and a first door 11 which closes off the passage opening defined by the first flange 10. The first door 11 is joined together with the flange 10 by a hinge 4.

Figure 4:
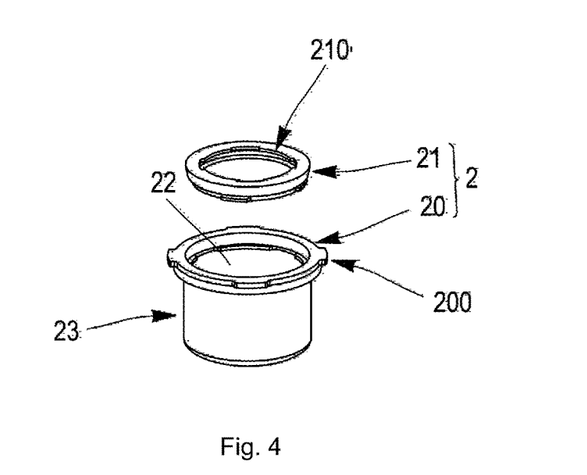
FIG. 4 is an exploded schematic view of a container forming the second volume.

The transfer device further comprises a second assembly 2, shown in FIG. 4, comprising a second flange 20 that defines a passage opening 22 into a second enclosed volume 23, and a second door 21 that closes off the passage opening defined by the second flange 20.

The first and second flanges 10, 20 are capable of being secured to each other by a first bayonet-type connection. Similarly, the first and second doors 11, 21 are capable of being secured to each other by a second connection, for example of the bayonet type. The flanges and doors are thus respectively provided with internal or external notches and lugs.

The first flange 10 and the first door 11 of the first volume will subsequently be referred to as the alpha flange 10 and the alpha door 11 and the second flange 20 and the second door 21 of the second volume as the beta flange 20 and the beta door 21.

According to a particular embodiment, the first enclosed volume is an enclosure while the second enclosed volume is a container of the type illustrated in FIG. 4. This is of course one embodiment, the device according to the invention not being limited to this type of enclosed volume.

Figure 1A:
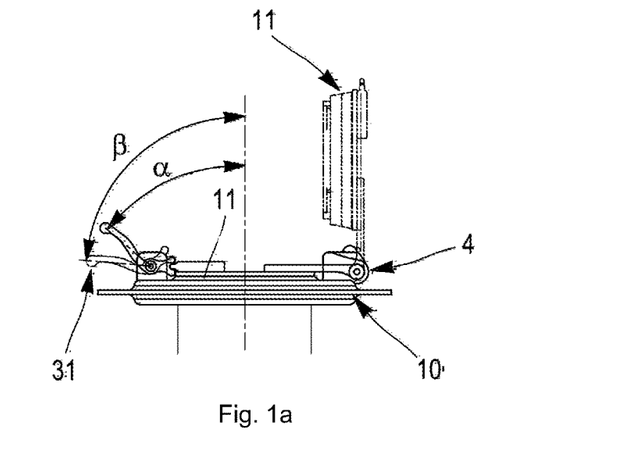
FIG. 1a is a top view of the closure assembly of FIG. 1.
Figure 2:
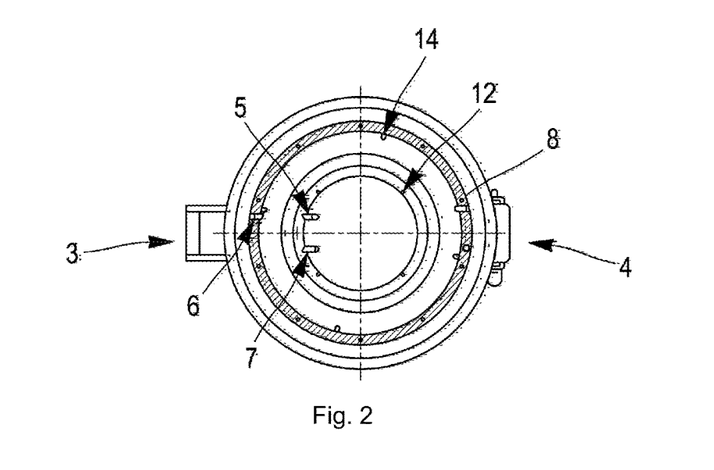
FIG. 2 is a longitudinal sectional view of the closure assembly of FIG. 1 along axis II-II.
Figure 3:
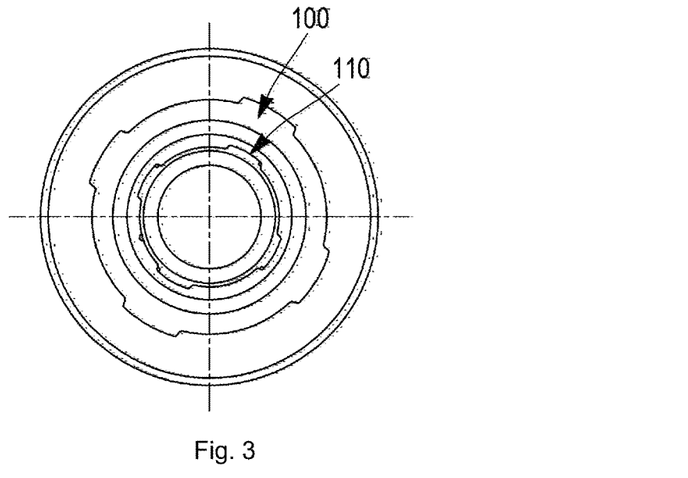
FIG. 3 is a sectional view of the closure assembly of FIG. 1, on the exterior side of the volume.

The device according to the invention further comprises a control mechanism comprising a control member 3 mounted on the alpha flange 10 so as to be movable between a closed position in which the alpha door 11 sealingly closes off the passage opening defined by the alpha flange 10, and a position for opening the alpha door and the beta door. In the depicted embodiment, the control member 3 is an opening handle 31 of the alpha door 11, which handle can be activated manually and is rotatably mounted about a rotational pin 30, which is arranged diametrically opposite the hinge 4, between a closed position in which the control member 3 forms an angle α with the transverse plane of the flange, and an open position in which said member forms an angle β with the transverse plane, the angle β being greater than the angle α (FIG. 1a). The pin 30 is advantageously located tangentially to the periphery of the alpha flange 10 and perpendicular to the passage opening axis associated with the alpha flange. The pin 30 is housed in a housing 32. The control member 3 and the hinge 4 are supported by the alpha flange 10.

Advantageously, the device according to the invention comprises means for indexing the control member 3 allowing blocking of said member when it is in the closed position of the alpha door 11 and in the open position of the alpha and beta doors.

In order to improve the safety associated with the joint opening of the doors of the two volumes and the placement of each of their interiors in communication, the transfer device comprises a set of safety mechanisms allowing the door and the beta flange 20 of the second volume to be unlocked only when the second volume is connected with the first volume.

More particularly, the illustrated sealed transfer device includes a set of securing mechanisms comprising two members for blocking the control member 3 and two members for locking the doors and flanges together. Thus, said device comprises a first blocking member 5 which blocks the control member 3 in the absence of the beta door 21, a second blocking member 6 which blocks said control member 3 in the absence of the associated beta flange 20, a first locking member 7 which interlocks the beta door 21 with the alpha door 11, and a second locking member 8 which interlocks the beta flange 20 with the alpha flange 10 when the two joined-together doors 11, 21 are open. The blocking member 5 and the locking member 7 are integrated into the door while the blocking member 6 is located in the control unit and the locking member 8 is located in the hinge 4. The operation of these securing means is described below.

Figure 5A:
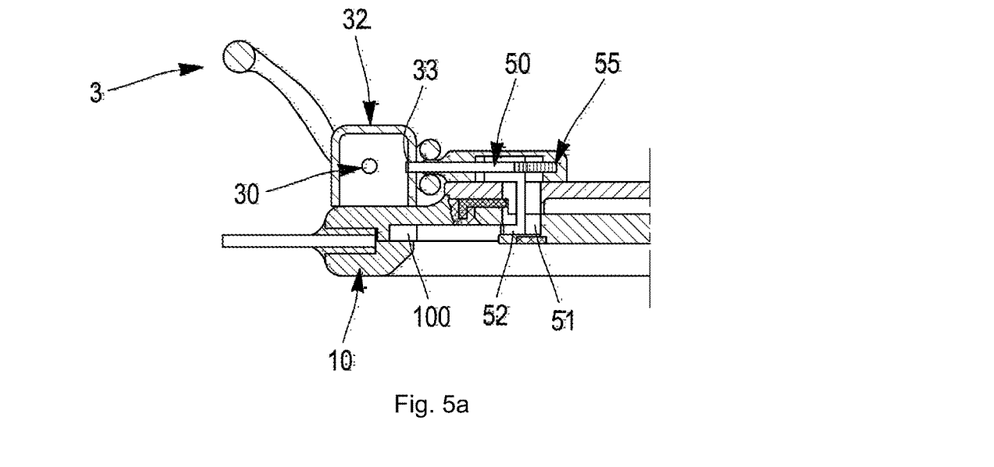
FIG. 5a is a cross-sectional view of the mechanism for the presence of the door of the second volume when the second volume is joined together with the first volume, the door of the first volume being in the locked position.
Figure 5B:
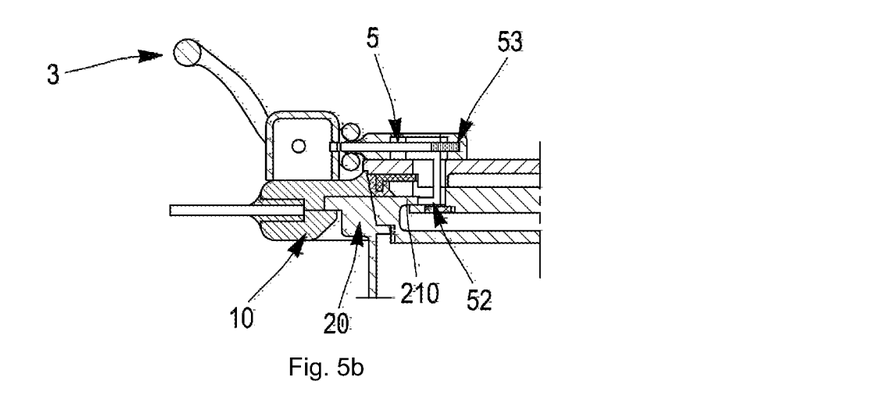
FIG. 5b shows the mechanism from FIG. 5a, the door of the first volume being in the unlocked position.
Figure 5C:
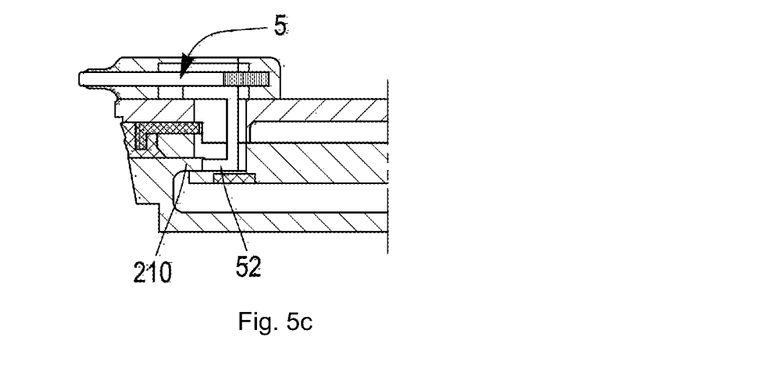
FIG. 5c is an enlarged view of the mechanism from FIG. 5b.

First Securing Means: Blocking Member 5 (FIG. 5a, 5b, 5c)

The first blocking member 5 has the function of blocking the control member 3 in the closed position while the beta door 21 is not locked to the alpha door 11. It thus forms what is referred to as a means for securing the presence of the beta door 21 on the alpha door 11.

This first blocking member 5 is a lock integrated into the alpha door 11. It comprises an upper finger 50 and a lower finger 52, which fingers are parallel to one another, extend in parallel with the plane of the alpha door 11, and are connected to one another by a joining wall. The blocking member 5 is mounted so as to slide radially, i.e., perpendicularly to the axis of the passage opening defined by the alpha flange and to the rotational pin 30 of the control member 3, in a cavity 51 provided in the alpha door 11, under the action of and against a return means, here a compression spring 55. The blocking member 5 is thus movable between a blocking position in which the blocking finger 50 is engaged in a blocking bore 33 provided in the housing 32, which is supported by the alpha flange 10 and in which is housed the pin 30 to which the control member 3 is coupled, and a release position in which the blocking finger 50 is disengaged from the blocking bore 33. In the absence of the container, the control member 3 is blocked in the closed position by the blocking finger 50 engaged in the blocking bore 33 (FIG. 5a). When the container is docked on the enclosure, the beta flange 20 and the beta door 21 are respectively brought into contact with the alpha flange 10 and the alpha door 11 of the enclosure, the external lugs 200 of the beta flange 20 being placed in the notches 100 in the alpha flange 10. The operator then turns the beta part (beta door and flange) clockwise (rotation of approximately 60 degrees) into the alpha part (alpha door and flange) until coming into contact with a stop 14 of the alpha flange 10. The beta flange 20 is then blocked in translation by the alpha flange 10. The beta door 21 is unlocked from the beta flange 20 and locked with the alpha door 11. During the rotational movement for connecting the beta part to the alpha part, one of the internal lugs 210 of the beta door 21 pushes the lower finger 52 of the blocking member 5, which has the effect of moving said finger into the cavity 51, against the action of the compression spring 55 and away from the alpha flange 10. The blocking member 5 carries along in its movement the finger 50, which then disengages from the blocking bore 33 in the block 32. Once said finger is released, the control member 3 can then be actuated to open the alpha and the beta door which are locked together. The locking together of the doors will be described later.

Figure 6A:
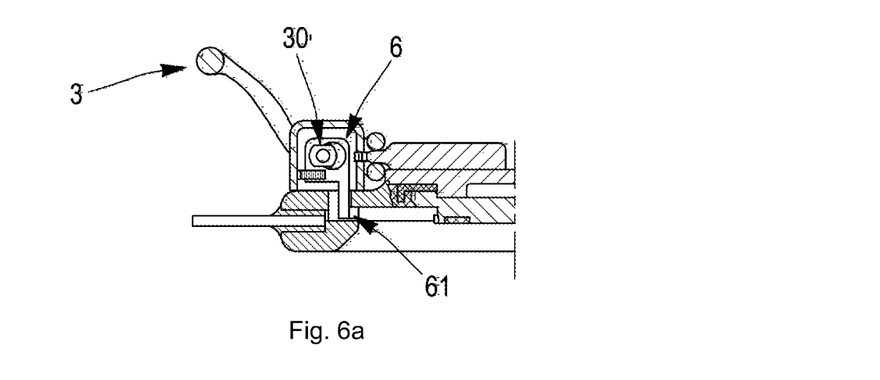
FIG. 6a is a cross-sectional view of the securing mechanism for detecting the presence of the flange of the second volume when the second volume is joined together with the first volume, the door of the first volume being in the locked position.
Figure 6B:
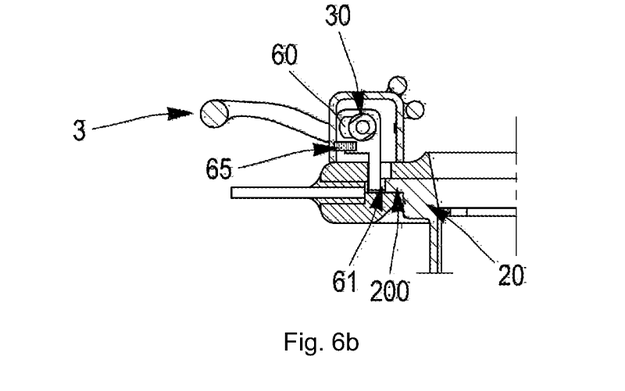
FIG. 6b is a cross-sectional view of the securing mechanism from FIG. 6a, the door of the first volume being in the unlocked position.

Second Securing Means: Blocking Member 6 (FIG. 6a, 6b)

The second blocking member 6 has the function of blocking the control member 3 in the closed position while the beta flange 20 is not completely secured to the alpha flange 10. It thus forms what is referred to as a means for securing the presence of the beta flange 20 on the alpha flange 10.

The second blocking member 6 acts as a latch. Its particular shape allows the opening to be mechanically blocked if the presence of beta flange 20 is not observed.

More particularly, the blocking member 6 comprises an eccentric hole 60 (in the example depicted, hole having two parallel and offset opening axes) receiving the rotational pin 30 of the control member 3. The blocking member 6 also comprises a finger 61 extending so as to project from alpha flange 10. This blocking member 6 is mounted in the housing 32 so as to be able to slide radially, i.e., perpendicularly to the axis of the passage opening defined by the alpha flange 10, under the action of and against a compression spring 65. It is movable between a blocking position in which the eccentric hole 60 blocks the rotational movement of the pin of the control member 3 (FIG. 6a) and a release position in which the eccentric hole is moved toward the external circumference of the alpha flange 10, to allow rotation of the rotational pin 30 to which the control member 3 is connected (FIG. 6b).

In the absence of the container, the rotational pin 30 passes through the part of the hole 60 blocking the rotational movement of said pin, and thus blocking the control member 3 in the closed position. When the container is docked on the enclosure, the beta flange 20 and the beta door 21 are brought into contact with the alpha flange 10 and the alpha door 11, the external lugs 200 of the beta flange 20 being placed in the notches 100 in the alpha flange 10. The beta part is then connected to the alpha part by turning the beta part into the alpha part clockwise (rotation of approximately 60°) until coming into contact with a stop 14 supported by the alpha flange 10. The beta flange 20 is then blocked in translation by the alpha flange 10. During the rotational movement for connecting the beta part to the alpha part, the external lug 200 of the beta flange 20 pushes the finger 61 of the second blocking member 6, which has the effect of moving the blocking member 6 radially, toward the outside of alpha flange 10, and therefore of moving the hole 60 relative to the rotational pin of control member 3 into the position in which the rotational pin 30 of control member 3 is released (FIG. 6b).

The advantage of providing these two blocking members 5, 6 is to provide double securing means in terms of opening the connected doors, it being possible for said doors to be opened only if the beta flange 20 and the beta door 21 are respectively well connected to the alpha flange 10 and the alpha door 11 of the enclosure. These two blocking members are thus means for securing the presence of the beta door and the beta flange on the associated alpha part.

Third Securing Means: Locking Member 7 (FIG. 7a to 7d)

Figure 7A:
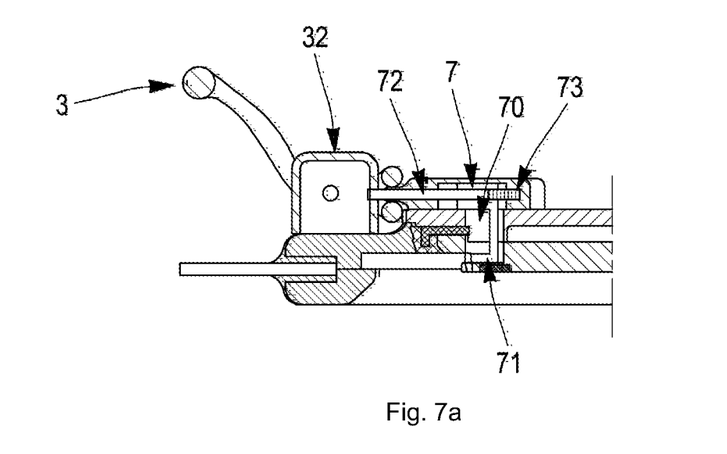
FIG. 7a is a cross-sectional view of the securing mechanism for locking the door of the second volume with the door of the first volume, the mechanism being in the unlocked position.
Figure 7B:
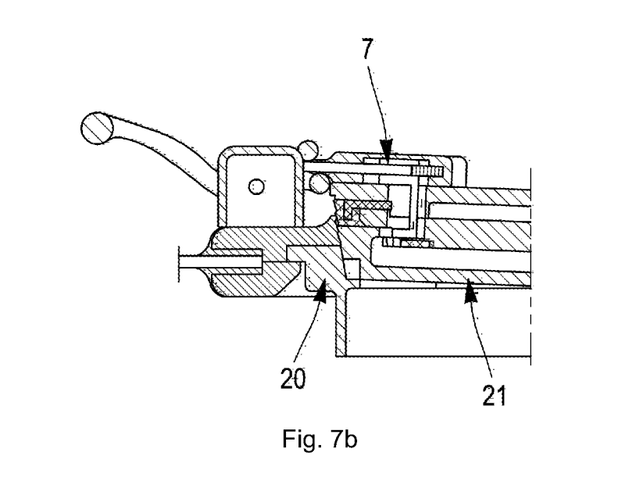
FIG. 7b is a cross-sectional view of the securing mechanism from FIG. 7a, the mechanism being shown while the doors are in the process of being opened.
Figure 7C:
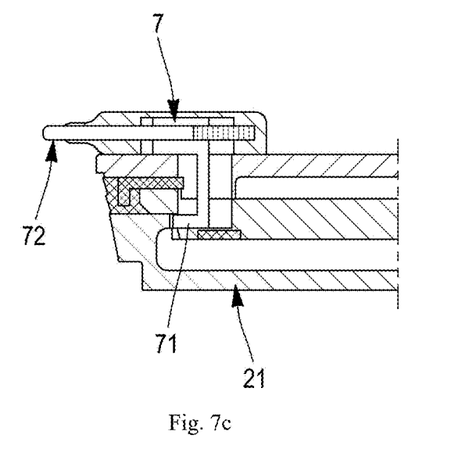
FIG. 7c is an enlarged view of the securing mechanism from FIG. 7a, the mechanism being shown in the position for locking the doors together.
Figure 7D:
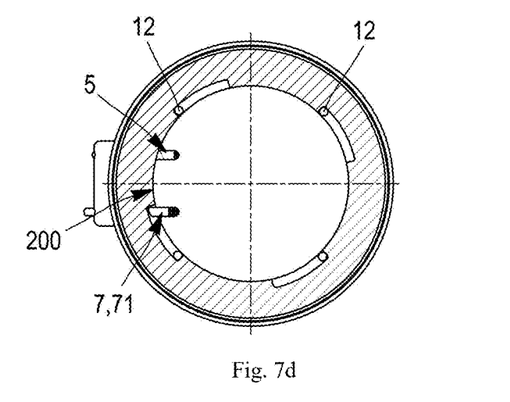
FIG. 7d is a longitudinal sectional view of the securing mechanism from FIG. 7c, the mechanism being in the position for locking the doors together.

The locking member 7 has the function of locking the beta door 21 to the alpha door 11, that is to say, of preventing the separation of the beta door 21 from the alpha door 11 when the control member 3 moves to the door opening position. The locking member 7 comprises a lower finger 71 and an upper finger 72, which fingers are parallel to one another, extend perpendicularly to the plane of the alpha door 11, and are connected to one another by a joining wall. The lower finger 71 forms a locking finger (also denoted by reference sign 71) capable of moving from a position in which it is recessed within the alpha door 11 and a locking position in which it projects radially from the alpha door 11. The locking member 7 is mounted so as to slide radially into a cavity 70 within the alpha door 11 against and under the action of a compression spring 73. When the control member 3 is in the closed position, the locking member 7 is held in abutment against the housing 32 via the upper finger 72 under the action of the compression spring 73 (FIG. 7a). When the control member 3 moves into the position for opening the doors, the alpha door 11 carries along in its rotational movement the upper finger 72, which disengages from the housing 32 (FIGS. 7b and 7c). When the upper finger 72 is completely disengaged, the locking member 7 is pushed by the compression spring toward the outside of the door, moving the locking finger 71 into the notch in the beta door 21. Since the beta door 21 is blocked by placing an internal lug 210 of the beta door 21 in abutment between the lower finger 71 and a stop 12 supported by the alpha door 11, said beta door can then no longer rotate with respect to the alpha door 11 (FIG. 7d). FIG. 7a to 7c show the movement of the locking member 7 during the transition of the locking member 7 from its position for closing the doors (FIG. 7a) to its position for opening the doors (FIG. 7c), depicting an intermediate position (FIG. 7b).

Fourth Securing Means: Locking Member 8 (FIG. 8a to 8c and Alternative FIG. 11 to 13b)

Figure 8:
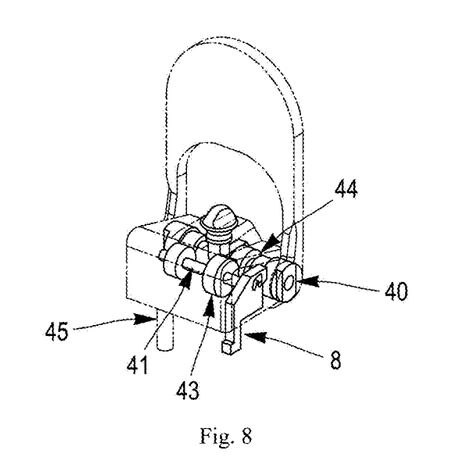
FIG. 8 is a perspective view of the securing mechanism for unlocking the flange of the second volume when the second volume is joined together with the first volume and the door of the first volume in the open position.
Figure 8A:
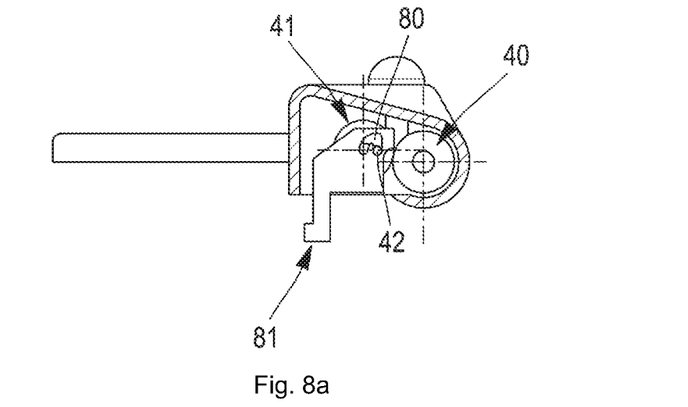
FIG. 8a is a cross-sectional view of the securing mechanism from FIG. 8 in a position for unlocking the flange of the second volume.
Figure 8B:
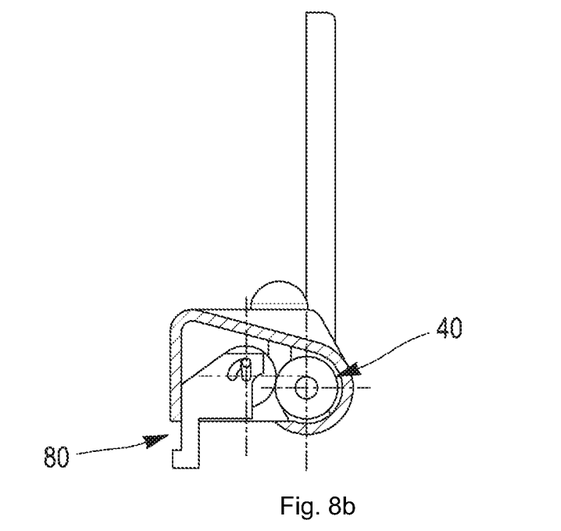
FIG. 8b is a cross-sectional view of the securing mechanism from FIG. 8 in an intermediate position for locking the flange of the second volume.
Figure 8C:
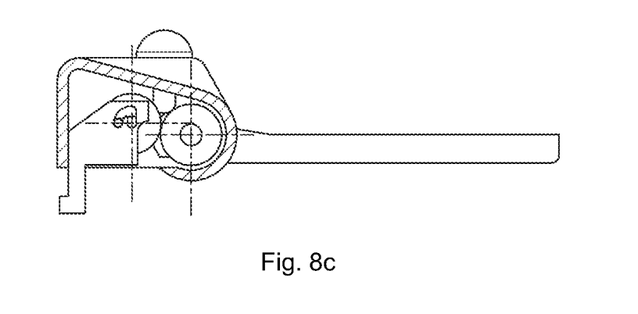
FIG. 8c is a cross-sectional view of the securing mechanism from FIG. 8 in a position for locking the flange of the second volume.

The locking member 8 has the function of locking the beta flange 20 with the alpha flange 10, that is to say, of preventing the separation of the beta flange 20 and the alpha flange 10, when the doors are open inside the enclosure. It is combined with the pin 40 of the hinge 4. It forms what is referred to as a means for securing, in an anti-unlocking manner, the open-door beta flange 20.

This locking member 8 comprises a hole 80 through which a peg 42 passes which is supported a second rotational pin 41 coupled to the pin 40 of the hinge 4 by drive means 43, 44 (cams in the example depicted). The second rotational pin 41 is also coupled to a third pin 45 that passes through the alpha flange 10 and that can be actuated by an external lever (not shown) so as to allow the alpha door 11 to open.

The locking member 8 comprises a finger 81 facing the inside of the passage opening.

Said locking member is translatable toward the inside of the passage opening of the alpha flange 10, perpendicularly to the rotational pin 40 of the hinge 4.

When the alpha door 11 is closed, the locking member 8 is placed such that the finger 81 is recessed relative to the internal surface of the alpha flange 10. When the doors are opened by actuation of the external lever, the third pin 45 rotates the second rotational pin 41 via the drive means 43. During the rotation of the second pin 41, the peg 42 slides along the hole 80 that is arranged to translate the locking member 8 and to position the finger of said locking member in the notch in the beta flange 20. Since the beta flange 20 is blocked by placing one of the external lugs 200 of the beta flange 20 in abutment against the finger 81 of the locking member and by a stop 14 of the alpha flange 10, said beta flange can then no longer rotate with respect to the alpha flange 10. In the previously described method, the opening of the doors is actuated by an external lever. It is of course clear that this is one embodiment, and that the hinge could be unconnected to an external lever (in this case the hinge would lack a third rotational pin). The door would then be opened manually, by pulling the alpha door from the inside, after releasing the control member 3.

Figure 9:
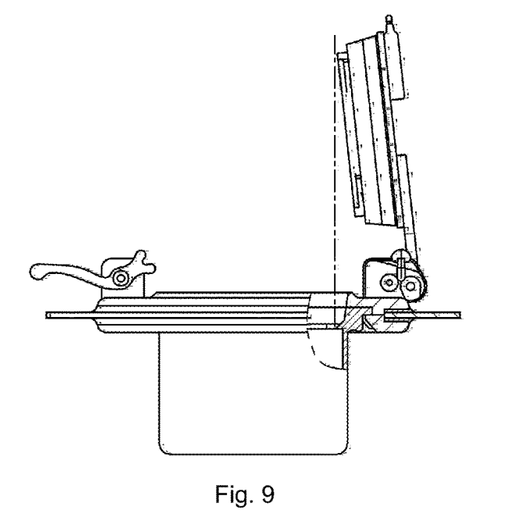
FIG. 9 is a sectional view of the transfer device shown with the connected doors of the two enclosed volumes in the minimally open position.
Figure 9A:
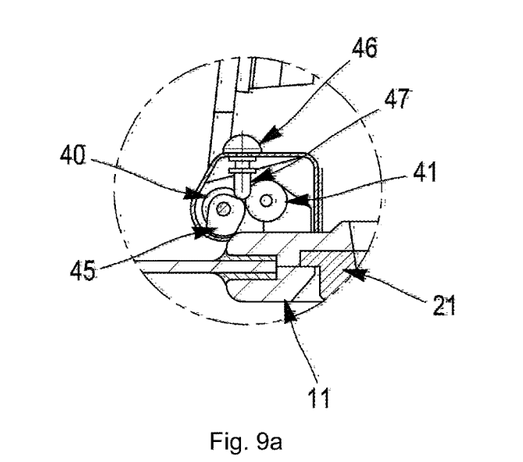
FIG. 9a is a detailed perspective view of the hinge of the transfer device from FIG. 9.
Figure 10:
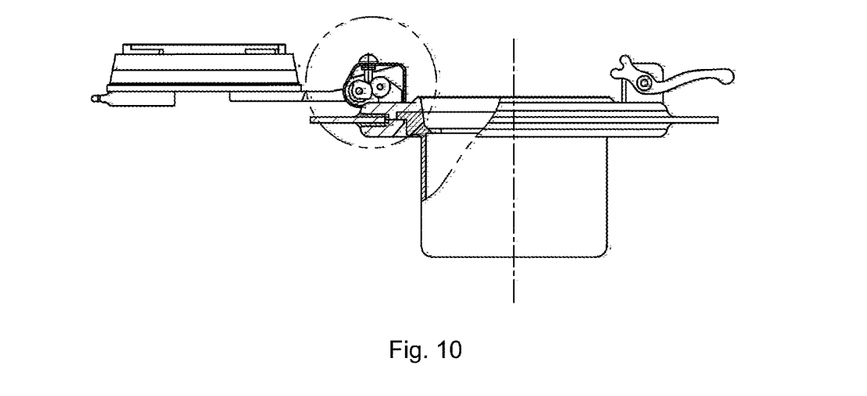
FIG. 10 is a sectional view of the transfer device shown with the connected doors of the two enclosed volumes in the maximally open position.
Figure 10A:
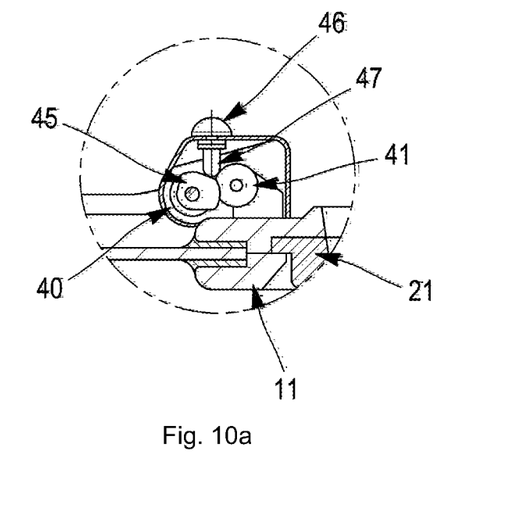
FIG. 10a is a detailed perspective view of the hinge of the transfer device from FIG. 10.

In order to free the passage of products from one enclosed volume to the other enclosed volume, a hinge is provided with an eccentric cam (FIG. 9, 9a, 10, 10a). Thus, the pin 40 of the hinge 4 comprises a cam 45 that advantageously has a notched surface and has a profile of substantially ovoidal shape arranged in stress with a peg 46, the part 47 of the peg in contact with the cam being movable in translation. This arrangement allows the door to be opened in a range at a minimum angle allowing the passage of the transferred products not to be blocked with respect to the plane in which the passage opening is located.

FIG. 11 to 13b show an alternative embodiment for locking the beta flange 20 with the alpha flange 10 when the doors are open inside the enclosure.

Figure 11:
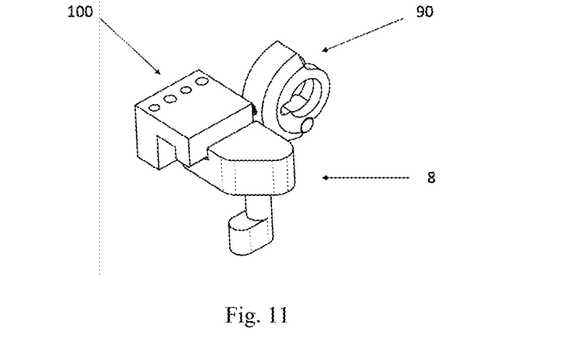
FIG. 11 is a perspective view from above of an alternative embodiment of the securing mechanism for locking the flange of the second volume when the second volume is joined together with the first volume and the door of the first volume in the open position.
Figure 12:
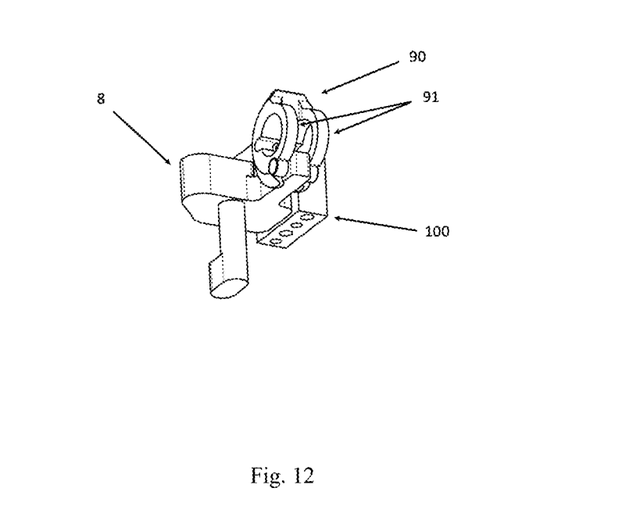
FIG. 12 is a perspective view from below of the securing mechanism from FIG. 11.
Figure 13:
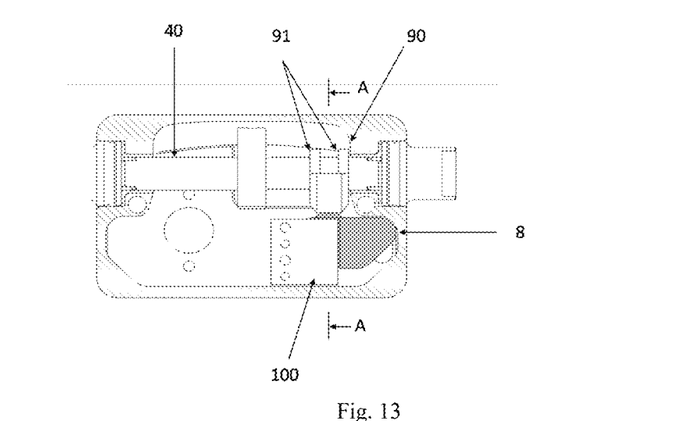
FIG. 13 is a cross-sectional view of the securing mechanism from FIG. 11 combined with the hinge pin.

In this alternative, the locking member 8 is connected to the pin 40 of the hinge 4 by a cam, which is fixedly mounted about the pin. The cam 90 has a first profile of claws 91 arranged to come under stress onto a peg 82 supported by the locking member 8 and thus to translate said locking member toward the passage opening during actuation of rotation in one direction (clockwise in the example depicted). The cam 90 also has a second profile 92 arranged to block the peg 82, and therefore for the translation of the locking member 8 when the alpha door 11 is in the closed position. Advantageously, the locking member 8 is guided in translation in a guide rail 100.

Figure 13A:
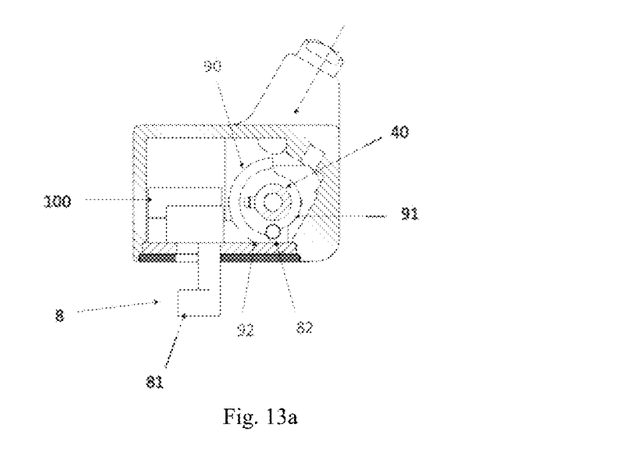
FIG. 13a is a cross-sectional view along the axis AA of the assembly depicted in FIG. 13 in a position for unlocking the flange of the second volume.
Figure 13B:
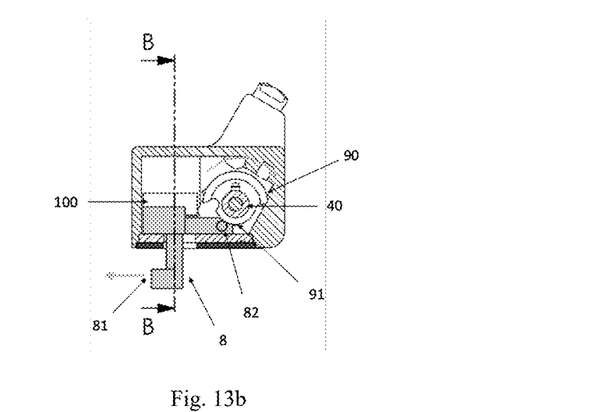
FIG. 13b is a view of the assembly from FIG. 13a in a position for locking the flange of the second volume.

Thus, when the alpha door 11 is closed, the locking member 8 is placed such that the finger 81 is recessed relative to the internal surface of the alpha flange 10 while the cam 90 is in the position for blocking the peg 82 via the second profile 92 (FIG. 13a). When the doors are opened, the pin 40 of the hinge 4 rotates in the clockwise direction, as depicted in FIG. 13b, rotating the cam 90 and thereby putting the peg 82 under stress via the profile of claws 91 of the cam. Since the locking member 8 is pushed by the cam 90, said locking member translates along the guide rail, in a manner guided by the guide rail 100, toward the passage opening, so as to position the finger 81 in the notch in the beta flange 20.

The invention is described above by way of example. It is understood that a person skilled in the art is in a position to produce various alternative embodiments of the invention without thereby departing from the scope of the invention.

The invention claimed is:

1. A sealed transfer device between two enclosed volumes, comprising:
    a first and a second flange that define a passage opening into the enclosed volumes, said first and said second flange being able to be secured to one another by a first bayonet connection,
    a first and a second door that close off the passage openings, it said first and said second door being able to be secured to one another by a second bayonet connection,
    the first door being hingedly mounted on the first flange by means of a hinge, said hinge comprising a hinge pin,
    a control mechanism comprising a control member movably mounted on the first flange between a closed position in which the first door closes off the associated passage opening and an open position of the first and second doors secured to one another,
    characterized in that the control mechanism comprises a locking member for locking the second door to the first door, ensuring that the doors are locked together when the control member switches into the open position of the first and second doors, said locking member being integrated into the first door; and
    characterized in that the locking member for locking the second door to the first door comprises a locking finger that extends toward the passage opening and is radially movable between a position in which it is recessed within the first door and a position for locking the doors together in which it projects radially from the first door.

2. The sealed transfer device according to claim 1, characterized in that it further comprises a member for locking the second flange to the first flange when the first and second doors are in the open position, said member being provided at the hinge.

3. The sealed transfer device according to claim 2, characterized in that the member for locking the second flange to the first flange comprises an oblong hole receiving a rotational pin parallel to the hinge pin and coupled to the latter by drive means on the one hand and a locking finger extending toward the passage opening, said locking member being translatable in a direction perpendicular to the hinge pin, between a position in which the finger is recessed within the first flange and a position for locking the flanges together in which the finger projects radially from the first flange.

4. The sealed transfer device according to claim 3, characterized in that the rotational pin is actuated by an external lever passing through the first flange so as to allow the opening of the first door.

5. The sealed transfer device according to claim 1, characterized in that the control mechanism further comprises a first blocking member ensuring the blocking of the control member in the closed position in the absence of the second flange.

6. The sealed transfer device according to claim 5, characterized in that the first blocking member comprises an eccentric hole crossed by a rotational pin with which the control member is secured, said first blocking member being radially movable between a locking position in which the eccentric hole blocks the rotation of said control member and an unlocking position in which the eccentric hole is moved to allow rotation of the control member, the movement of said first blocking member being ensured by a lug of the bayonet system of the second flange.

7. The sealed transfer device according to claim 1, characterized in that the control mechanism comprises a second blocking member ensuring the blocking of the control member in the absence of the second door.

8. The sealed transfer device according to claim 7, characterized in that said second blocking member is radially movable between a blocking position in which it has a peripheral end engaged in a blocking bore in said control member and a release position in which said peripheral end is disengaged from the blocking bore, said second blocking member being moved by a lug of the bayonet system of the second door.

9. The sealed transfer device according to claim 1, characterized in that the control member is movable about an axis tangential to the periphery of said first flange, between a closed position where said member forms an angle a with the transverse plane of the flange, and an open position where said member forms an angle β greater than α with the transverse plane and causes the coupled doors to open.

10. The sealed transfer device according to claim 1, characterized in that the control member is a handle for opening the alpha door, which can be activated manually and is movably mounted in rotation about a pin parallel to the hinge pin and located diametrically opposite the hinge.

* * * * *